May 14, 1935.                J. A. LONG ET AL                2,001,204
                 PIPE JOINT AND METHOD OF MAKING THE SAME
                          Filed March 3, 1934
FIG. I.
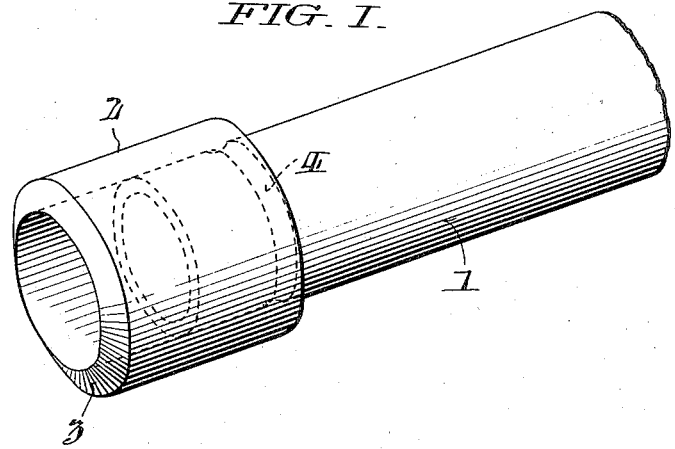
FIG. II.
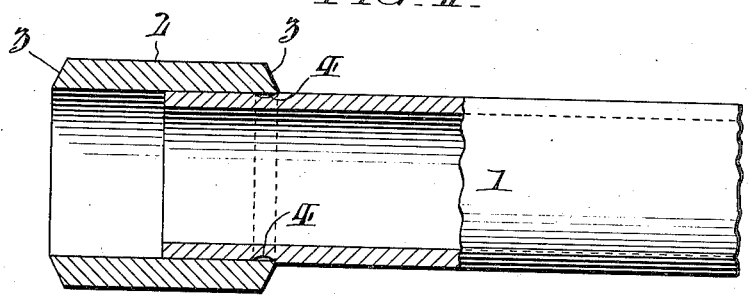
FIG. III.
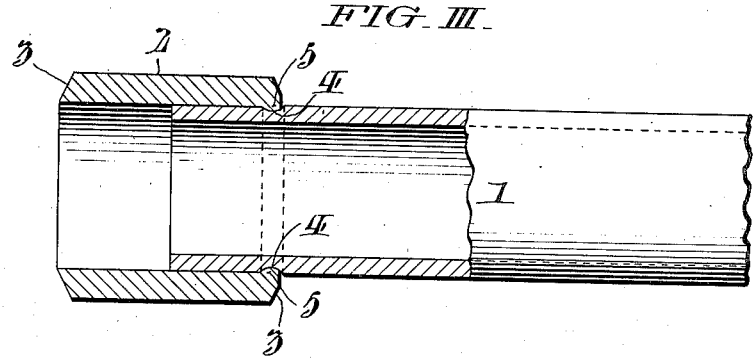
WITNESSES:
John A. Weidler
William Bell, Jr.
INVENTORS:
James A. Long &
Howard E. Frant,
BY Fraley Paul
ATTORNEYS.

Patented May 14, 1935

2,001,204

UNITED STATES PATENT OFFICE 2,001,204

PIPE JOINT AND METHOD OF MAKING THE SAME

James A. Long and Howard E. Fiant, Reading, Pa.

Application March 3, 1934, Serial No. 713,793

6 Claims. (Cl. 29—148.2)

Our invention relates to joints for pipes or other tubular metal members, wherein one member overlaps another and is joined thereto with a fluid-tight seal, and to the method of assembling such joints.

Heretofore it has been the usual practice among pipe fitters to form joints by interiorly and exteriorly threading the parts to be joined and screwing one part into the other. The formation of screw threads on a section of pipe necessarily weakens the wall of the pipe at the points where the threads are formed, and this factor must be taken into account in initially determining the wall thickness required. It is, therefore, customary in the manufacture of standard pipe to make the walls overthick so that the pipe will be of sufficient strength after threads are cut thereon. Moreover, experience has proved that pipe sections almost invariably break at the threaded joints rather than in the area between joints.

Various attempts have been made to dispense with the use of screw threads in certain types of pipe joints. For example, it has been proposed to employ telescoping pipe fittings and to utilize a sealing material between such fittings; and it has also been proposed to compress portions of the exterior fitting to form a mechanical interlock with the interior fitting, but, so far as we are aware, such proposals have not matured into successful practice because of the difficulties in obtaining the requisite close fit without serious deformation of the parts to be fitted, or because the methods are too costly or too laborious to be practicable.

Accordingly, the object of the present invention is to provide a pipe joint, or method of assembling the same, in which the adjoining sections are united by a firm bond, the joint being characterized by tightness, strength, simplicity of construction, and economy as to the manufacture of the component parts and the assembly thereof.

Other objects and advantages characteristic of our invention, including particularly those derived from the use of a method which does not involve any serious deformation or weakening of the adjoining pipe sections, will become more apparent from the description hereinafter set forth of one embodiment or example of the practice of the invention, such description having reference to the accompanying drawing.

Of the drawing:

Fig. I represents a perspective view of one form of joint of our invention applied between a pipe section and pipe coupling.

Fig. II represents an elevation of the same with portions broken away and showing the first step in the assembly of the joint; and Fig. III represents a similar elevation of the same, showing the second step in the assembly of the joint.

In the drawing, there is shown a joint effected between a section of pipe 1 and a tubular coupling 2. Before their assembly, the tubular members 1 and 2 are machined exteriorly and interiorly, respectively, to provide exact sizes for a shrink-fit or press-fit. The coupling member 2 is beveled at its ends as indicated at 3, and the bevel is preferably so formed that the length of the inside surface of the wall is only slightly greater than the length of the outside surface of the wall.

As shown in Fig. II, the pipe section 1 is formed with an annular groove 4 at a distance from the end thereof corresponding to slightly less than half the length of the coupling to be used. Desirably, the annular groove 4 is cut out without distortion of the metal at the inner surface of the pipe section so that when the joint is completed, there will be no obstruction to flow of the fluid in the pipe line, and the two adjoining pipe sections (only one of which is shown in the drawing) will be in alignment, and constitute in effect a continuous pipe line of uniform interior diameter throughout. Moreover, as clearly shown in the drawing, the annular groove 4 is in cross section smoothly rounded or otherwise formed with avoidance of sharp angles.

After the pipe section 1 and coupling 2 have thus been formed, the parts are assembled together as shown in Fig. II, with the beveled end of the coupling 2 disposed opposite to the annular groove 4 of the pipe section 1. In order to obtain press-fitting engagement between the pipe section 1 and the coupling 2, the latter element is preferably shrunk upon the former element, though it may be driven or otherwise forced into engagement therewith. This may be accomplished by machining the pipe section 1 to an exact exterior diameter and machining the pipe coupling 2 to an exact interior diameter, slightly less than the exterior diameter of the pipe section 1, then heating the coupling member 2, and forcing it with a close fit upon the end of the pipe section 1, and subsequently allowing the coupling member 2 to cool with resulting shrinkage and radial pressure exerted upon the pipe section 1. While the methods employed for obtaining a pressure fit between the pipe section 1 and the coupling 2 may be varied, it is important that the parts intimately engage each other with sufficient pressure exerted inwardly to maintain a fluid tight joint.

After the parts have thus been assembled, a swaging operation is performed at the beveled end 3 of the coupling 2 to produce an inwardly directed annular boss 5 which interlocks with the groove 4 in the pipe section 1 and forms therewith a fluid tight seal. In using the term "swaging", we mean to include caulking or otherwise upsetting the beveled end 3 of the coupling 2 to produce the annular boss 5. Desirably, the operation of swaging the beveled end of the coupling 2 is accomplished with a tool which is directed substantially edgewise against the end of the coupling member 2, thus bearing upon the angle produced by the bevel at the inside edge of the coupling, and forcing the metal into the desired shape filling the annular groove 4. In performing the swaging operation in the manner described, a tight seal may be effected at the annular groove 4 without distortion of the wall of the pipe section 1. When the operation has been completed, the parts assume the relation shown in Fig. III. A firm bond is created throughout the length of the joint, with increase rather than sacrifice of strength in the area of the joint and without disturbing the inner surface of the pipe section.

It will be apparent that with the form of pipe joint illustrated in the drawing, the operations involved in constructing and assembling the parts are of a simple nature demanding no great skill on the part of the pipe fitter and involving no greater time and labor than is ordinarily involved in the formation of screw threaded joints. Moreover, a firm bond is created at the joint, and the interior diameter of the pipe line is not diminished at any point, nor are there any inwardly directed projections which might cause obstruction to flow. Accordingly, the pipe joint of this invention possesses the desired characteristics of simplicity, strength and ease of assembly without the disadvantages which characterize certain pipe joints which have heretofore been proposed.

While we have shown a specific example of the practice of our invention, it will be apparent, especially to those skilled in the art, that changes may be made in the particular steps involved in assembling the parts of the pipe joint and in the formation of the parts preparatory to assembly, without departing from the spirit of our invention as defined in the annexed claims. For example, it will be understood that where adjoining pipe sections are to be connected by a coupling member, the coupling member may be shrunk, or otherwise securely fitted, upon one pipe section and swaged to interlock the groove thereon, and then in a subsequent operation fitted to the second pipe section, or, alternatively, the coupling member may be simultaneously fitted to both pipe sections in a single operation, and then swaged to interlock the grooves of both pipe sections.

Having thus described our invention, we claim:

1. A method of joining overlapping tubular metal members which consists in forming the outer member with a beveled edge at the end thereof inclined downwardly and outwardly, forming the inner member with an annular groove in its outer surface, assembling said members together in overlapping pressure-fitting engagement with the beveled edge of the outer member disposed opposite said annular groove in the inner member, and swaging the outer member at said beveled edge to produce an inwardly extending boss interlocking with said groove and forming a fluid-tight seal therewith.

2. A method of joining overlapping tubular metal members which consists in forming the outer member with a beveled edge at the end thereof inclined downwardly and outwardly, cutting out an annular groove in the outer surface of the inner member, assembling said members together in overlapping pressure-fitting engagement with the beveled edge of the outer member disposed opposite said annular groove in the inner member, and swaging edge-wise the end of said outer member to produce an annular boss thereon interlocking with said groove and forming a fluid tight seal therewith without distortion of the wall of said inner member in the vicinity of said groove.

3. In a pipe joint, inner and outer tubular members in pressure-fitting overlapping engagement with each other, one of said members having a smoothly rounded preformed groove in the surface thereof bearing upon the second member and being otherwise undeformed, and the second member being formed with an annular boss at the end thereof interlocking with said groove and forming therewith a fluid-tight seal.

4. A method of joining overlapping tubular members to effect a pipe joint which consists in cutting an annular groove in the wall of the inner member exteriorly thereof, said groove being substantially arcuate in cross section, assembling said members together in overlapping press-fitting engagement with one end of the outer member surrounding said groove, and swaging the end of the outer member inwardly to produce an annular boss interlocking with said annular groove and forming therewith a fluid-tight seal.

5. A method of joining an overlapping coupling member to contiguous tubular sections to effect a pipe joint which consists in cutting annular grooves in the walls of each tubular section exteriorly thereof, said grooves being substantially arcuate in cross section, assembling said coupling member and tubular sections together with the coupling member in surrounding press-fitting engagement with adjoining portions of said tubular sections and with the ends of the coupling member surrounding the annular grooves aforesaid, and swaging the ends of said coupling member inwardly to produce annular bosses interlocking with said grooves and forming therewith fluid-tight seals.

6. In a pipe joint contiguous aligned tubular sections, and a coupling member in overlapping pressure-fitting engagement with adjoining portions of said tubular sections, each tubular section having a rounded groove cut in the outer surface thereof and the coupling member having inwardly extending annular bosses at each end interlocking with said grooves and forming therewith fluid-tight seals.

JAMES A. LONG.
HOWARD E. FIANT.